No. 670,121. Patented Mar. 19, 1901.
W. VAN WAGONER.
RUNNING GEAR FOR AUTOMOBILES.
(Application filed Apr. 2, 1900.)
(No Model.) 6 Sheets—Sheet 1.
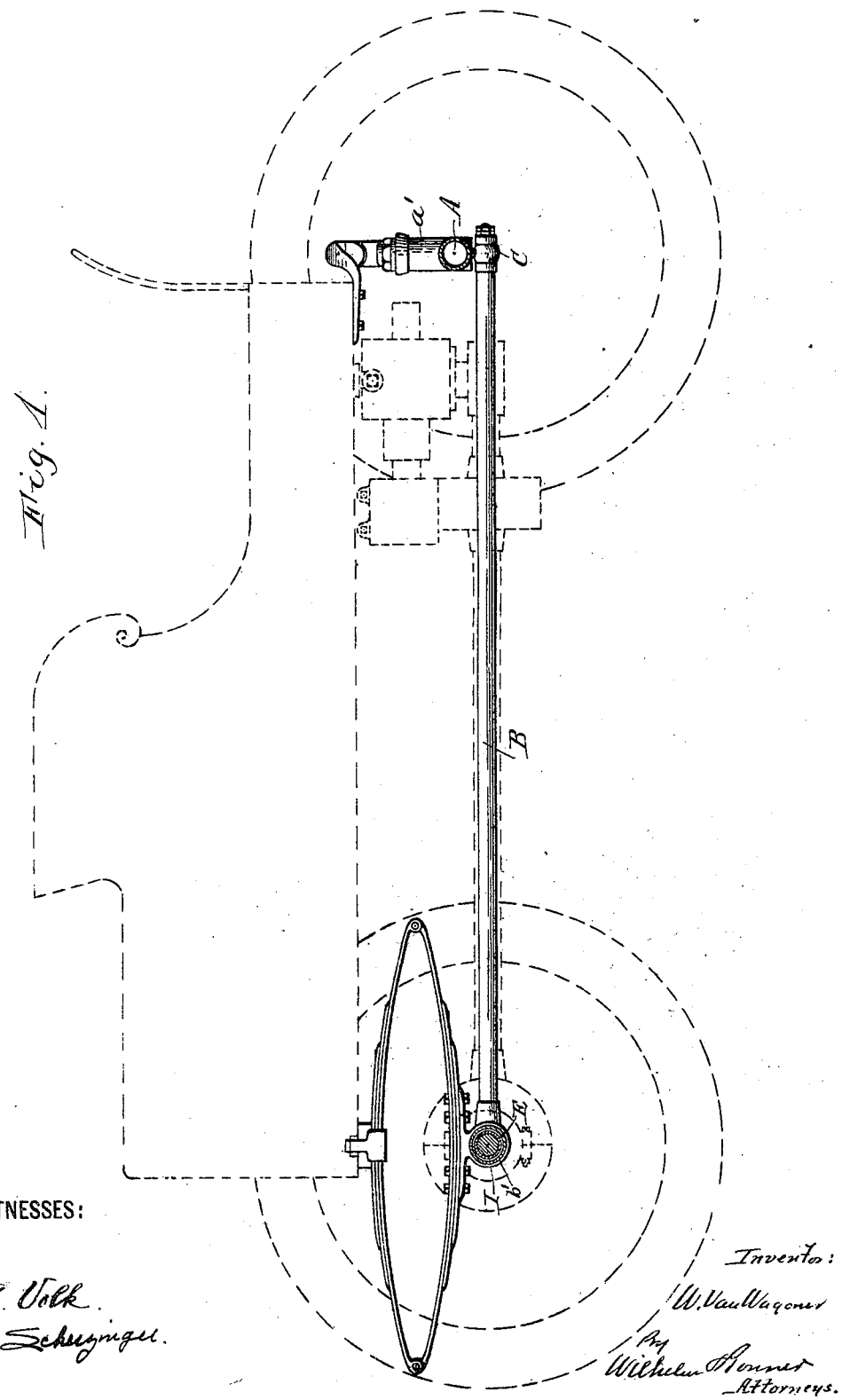
WITNESSES:

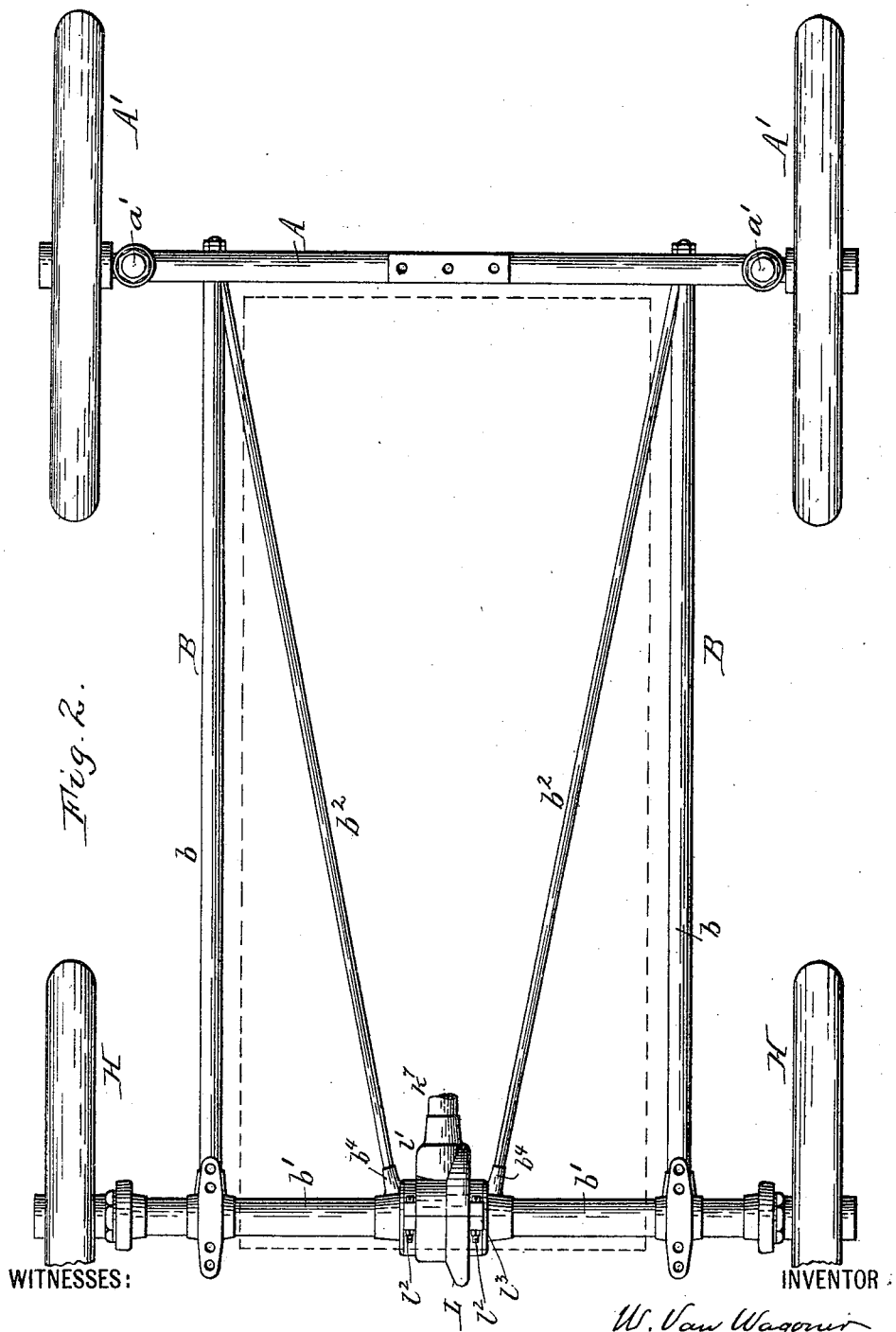

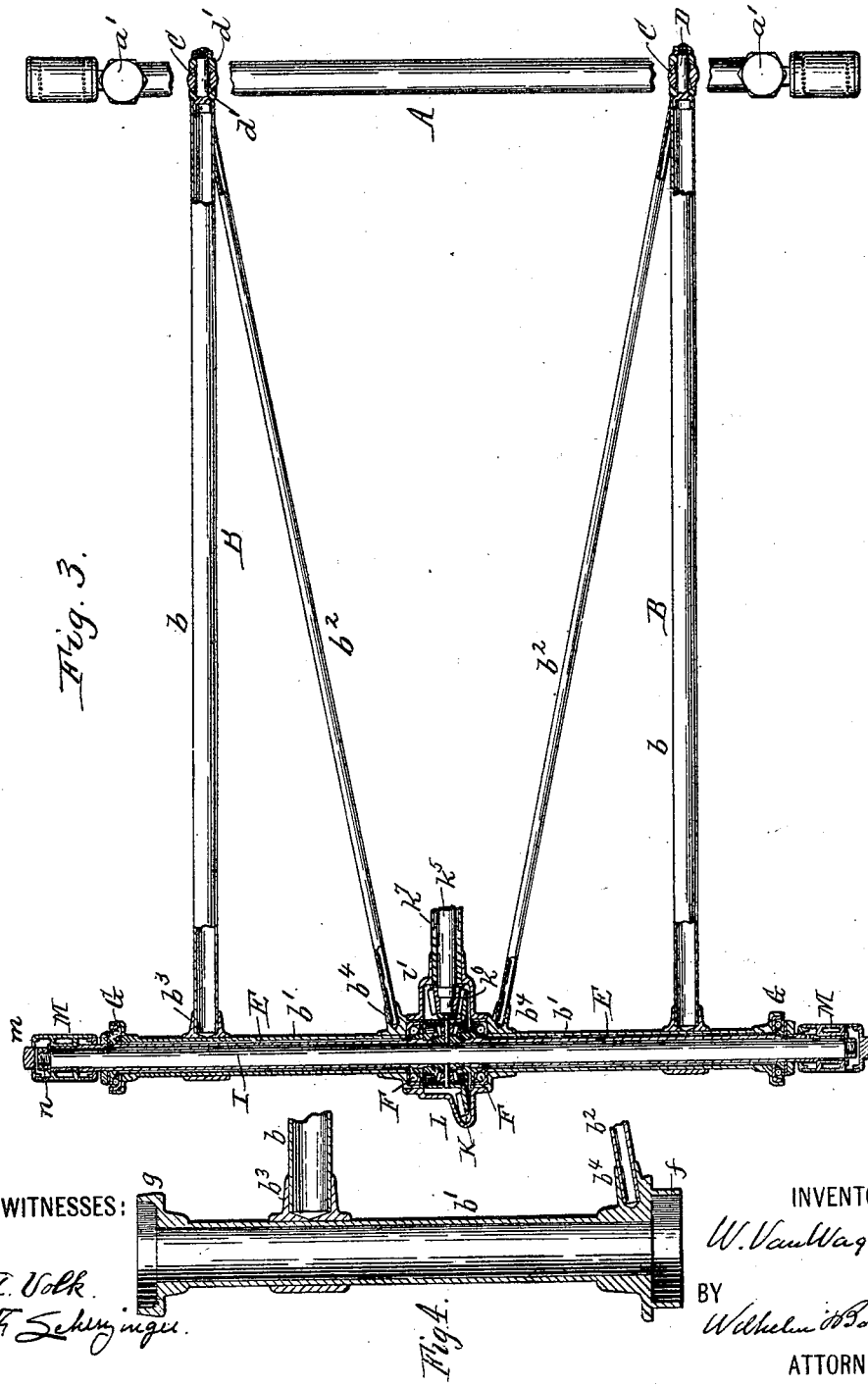

No. 670,121. Patented Mar. 19, 1901.
W. VAN WAGONER.
RUNNING GEAR FOR AUTOMOBILES.
(Application filed Apr. 2, 1900.)
(No Model.) 6 Sheets—Sheet 4.
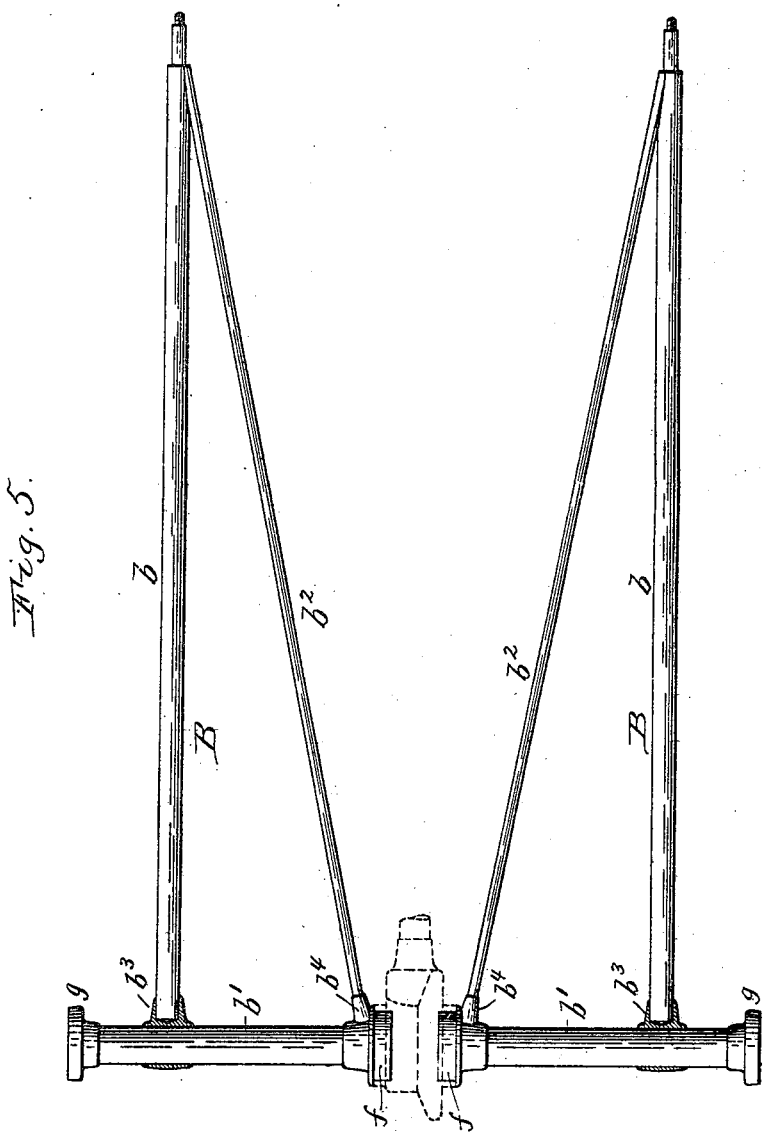
WITNESSES:
E. A. Volk
F. F. Schlesinger
INVENTOR
W. Van Wagoner
BY
Wilhelm Bonner
ATTORNEYS.

No. 670,121. Patented Mar. 19, 1901.
W. VAN WAGONER.
RUNNING GEAR FOR AUTOMOBILES.
(Application filed Apr. 2, 1900.)
(No Model.) 6 Sheets—Sheet 5.
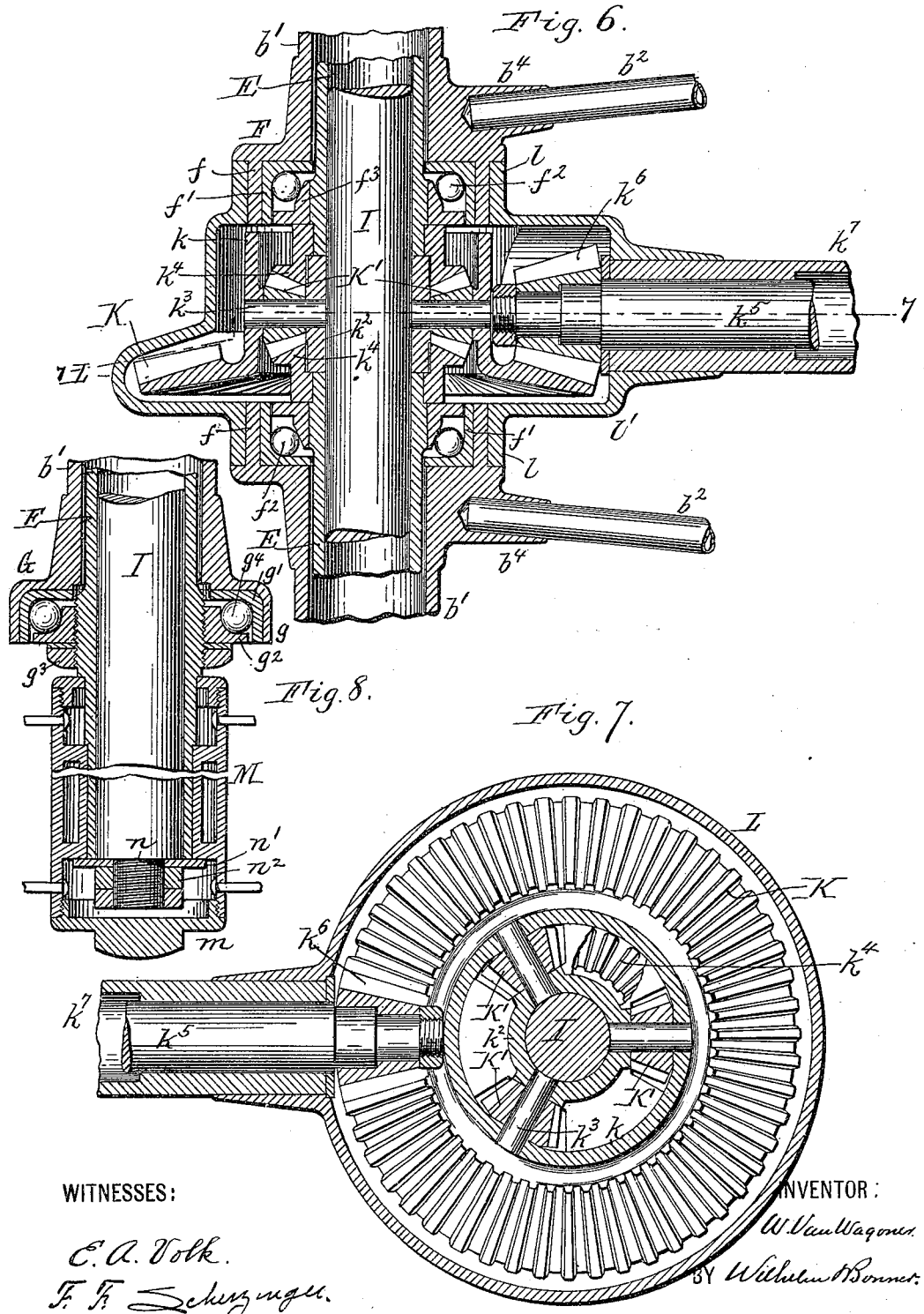

No. 670,121. Patented Mar. 19, 1901.
W. VAN WAGONER.
RUNNING GEAR FOR AUTOMOBILES.
(Application filed Apr. 2, 1900.)
(No Model.) 6 Sheets—Sheet 6.
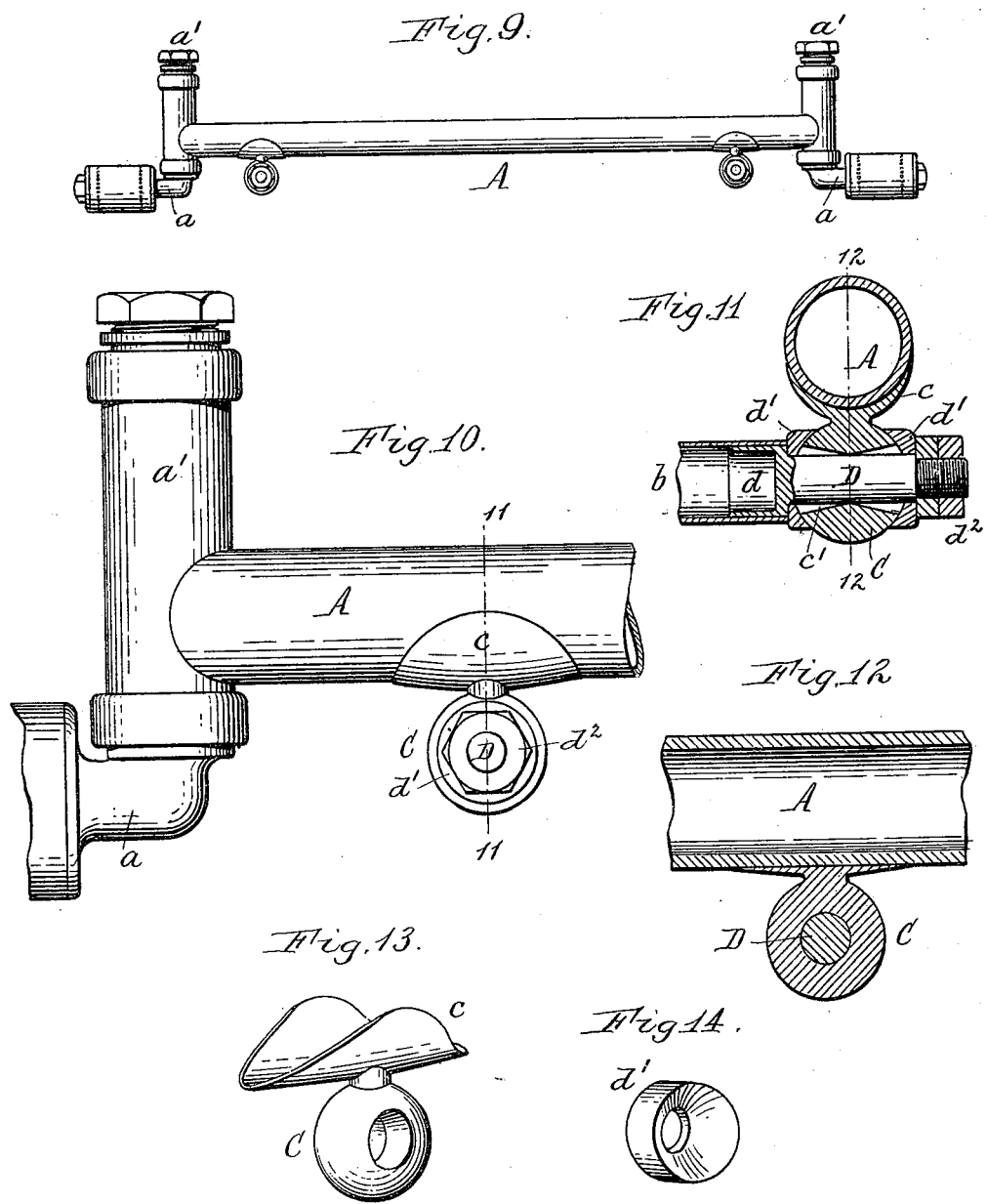
Witnesses:
E. A. Volk.
F. F. Scherzinger.
William Van Wagoner, Inventor.
By Wilhelm Bonner,
Attorneys.

UNITED STATES PATENT OFFICE.

WILLIAM VAN WAGONER, OF SYRACUSE, NEW YORK, ASSIGNOR TO CENTURY MOTOR VEHICLE COMPANY, OF SAME PLACE.

RUNNING-GEAR FOR AUTOMOBILES.

SPECIFICATION forming part of Letters Patent No. 670,121, dated March 19, 1901.

Application filed April 2, 1900. Serial No. 11,206. (No model.)

*To all whom it may concern:*

Be it known that I, WILLIAM VAN WAGONER, a citizen of the United States, and a resident of Syracuse, in the county of Onondaga, in the State of New York, have invented a new and useful Improvement in Running-Gears for Automobiles, of which the following is a specification.

This invention relates to the running-gear of four-wheeled automobiles in which the motive power is applied to the rear wheels.

The object of my invention is to produce a running-gear which is light, strong, and durable and which possesses the necessary flexibility to allow each of the four wheels to rise and fall in traveling over rough roads without straining or wrenching the running-gear.

In the accompanying drawings, consisting of six sheets, Figure 1 is a longitudinal sectional elevation of my improved running-gear, showing other parts of the automobile—such as the wheels, body, and driving mechanism—in dotted lines. Fig. 2 is a top plan view of the running-gear. Fig. 3 is a similar view showing the rear portion of the running-gear and the connection of the side frames with the front axle in horizontal section. Fig. 4 is a detached horizontal section of one of the tubular-axle casings. Fig. 5 is a top plan view of the two reach-frames of the running-gear. Fig. 6 is a horizontal section, on an enlarged scale, of the inner portions of the tubular axles and connecting parts. Fig. 7 is a longitudinal vertical section in line 7 7, Fig. 6, viewed in the direction of the arrow. Fig. 8 is a longitudinal horizontal section of the outer end of one of the axles and connecting parts on an enlarged scale. Fig. 9 is a front elevation of the front axle and connecting parts. Fig. 10 is a fragmentary front elevation of one end portion of the front axle on an enlarged scale. Fig. 11 is a vertical section in line 11 11, Fig. 10. Fig. 12 is a vertical section at right angles to Fig. 11 in line 12 12, Fig. 11. Fig. 13 is a detached perspective view of one of the spherical knuckles which are secured to the front axle for supporting the front ends of the side frames. Fig. 14 is a perspective view of one of the spherical washers which are applied to these knuckles.

Like letters of reference refer to like parts in the several figures.

A represents the fixed front axle, which is provided at its ends with pivoted wheel-spindles $a$, which carry the front wheels A' and are connected with the fixed axle by vertical steering-heads $a'$. The axle A is preferably constructed of tubing, and the spindle and steering-heads are constructed and connected in any suitable or well-known manner.

B represents the two side frames or reaches of the running-gear, which consist each, preferably as shown, of a longitudinal outer bar $b$, a tubular axle-casing $b'$, which is arranged transversely at the rear end of the longitudinal bar $b$, and an angle-brace $b^2$, which connects the inner end of the axle-casing $b'$ with the front end of the longitudinal bar $b$. The three members of each frame are arranged in a horizontal plane and form a light and rigid frame. The longitudinal bar $b$ and the brace $b^2$ are preferably constructed of tubing, as shown, and secured with their rear ends by brazing or otherwise, respectively, in sockets $b^3$ $b^4$, formed on the axle-casing $b'$. The front end of the brace $b^2$ is rigidly secured by brazing or otherwise to the front end of the horizontal bar $b$. The front end of each side frame or reach is connected with the front axle by a flexible coupling, which is shown most clearly in Figs. 3 and 9 to 14 and which is constructed as follows:

C represents a spherical knuckle which is arranged on the under side of the front axle A in line with the front end of the side reach B. This knuckle depends from the axle and is secured to the same by an attaching-flange $c$, brazed to the axle, or by other suitable means. The knuckle is provided with a longitudinal bore $c'$, which flares from the center of the knuckle forwardly and backwardly.

D is a stud which is secured to the front end of the reach and projects through the bore of the knuckle. This stud is preferably inserted with its enlarged rear portion $d$ in the tubular bar $b$, as shown, and is secured by brazing. $d'$ represents washers which are applied to this stud on the front and rear sides of the knuckle and which have spherical faces by which they bear against the knuckle. These parts are held together by screw-nuts $d^2$, applied to the threaded front end of the stud. The weight of the reach and its load is mainly transmitted by the washers to the spherical knuckle. The stud is free to turn axially in the bore of the knuckle and is also capable of oscillating movement in any direction within the limits allowed by the flare of the bore. The washers follow these movements of the stud and maintain a snug contact with the outer surface of the knuckle in all positions of the stud. These couplings enable either end of the front axle and either end of the rear axle to rise or fall without in any way straining, cramping, or twisting the frames or reaches or their connections with the other parts of the running-gear.

E represents the hollow or tubular rear axles, which are arranged within the axle-casings $b'$ of the frames and are each journaled in the same by an inner ball-bearing F and an outer ball-bearing G, Figs. 3, 6, and 8.

H represents the rear wheels, which are secured to the outer ends of the hollow axles E.

I represents a cylindrical axle-core which extends through both rear axles and fits snugly in the bores of the same, so as to hold the two axles in line.

The inner end of each casing $b'$ is enlarged and provided with an inwardly-projecting cylindrical collar $f$, in which is seated the ball-cup $f'$ of the inner ball-bearing F.

$f^2$ represents the balls, and $f^2$ the cone, which is arranged within the annular row of balls $f^2$ and which is secured to the axle E, near the inner end thereof, by brazing or otherwise.

The inner ends of the two axles E are connected by a compensating gearing of well-known construction. This gearing consists, as shown in Figs. 6 and 7, of the following parts: K represents the driving bevel-gear wheel, which is mounted with its hub $k$ loosely upon the axle-core I between the inner ends of the two axles. K' represents bevel-pinions which are arranged in the body of the gear-wheel K, between the hub $k$ and the gear-rim $k^2$ thereof, and are journaled on radial arbors $k^3$. Three of these pinions are preferably employed, as shown. $k^4$ represents bevel gear-wheels which mesh with these pinions and are secured to the inner ends of the axles E by brazing or otherwise. $k^5$ represents the longitudinal driving-shaft, which carries at its rear end the driving-pinion $k^6$. The latter meshes with the driving gear-wheel K in front of the axles E.

L represents the gear-casing, which incloses the compensating gearing and which is provided on both sides with laterally-projecting collars $l$. These collars of the casing fit upon and surround the collars $f$ at the inner ends of the tubular-axle casings $b'$, so that this gear-casing is supported on the inner ends of both axle-casings and can turn on the same. The gear-casing is provided on its front side with an extension $l'$, which incloses the driving-pinion $k^6$ and which connects with the rear end of the tubular casing $k^7$ of the driving-shaft $k^5$. The gear-casing L is divided vertically into a front and rear part, which are connected by bolts $l^2$, passing through ears $l^3$, as represented in Fig. 2.

The outer end of the axle and the parts connected therewith are shown in detail in Fig. 8 and are constructed as follows: $g$ represents an enlarged collar which is secured to the outer end of each axle-casing $b'$ by brazing or otherwise, and which contains the ball-cup $g'$ of the outer ball-bearing G. $g^2$ represents the ball-cone, which is mounted on the outer portion of the axle E and made adjustable toward the ball-cup, preferably as shown, by being connected with the axle by a screw-thread. $g^3$ represents a jam-nut arranged against the cone, and $g^4$ represents the balls interposed between the cone and cup.

M represents the hub of the rear wheel, which is secured to the axle E outside of the ball-bearing by a key or otherwise.

The outer end of the axle-core I is provided with a screw-threaded stud $n$, to which a washer $n'$ and screw-nuts $n^2$ are applied. The washer bears against the outer end of the tubular axle E. These fastening devices applied to the ends of the axle-core tie the two axles together and hold them against lateral displacement.

$m$ represents a cap which is applied to the outer end of the hub M and which incloses and protects the fastening devices at the adjacent end of the axle-core.

In my improved running-gear the rear parts of the two reaches are held in alinement transversely; but each reach is capable of independent rotary adjustment at its rear end by the axle-casings turning on the ball-bearings of the axles and in the collars of the gear-casing and also capable of independent adjustment at its front end. This enables either of the four wheels to rise or fall without cramping or twisting the parts. The gear-casing is capable of rotary movement on the axle-casings and turns thereon as the front end of the longitudinal driving-shaft rises and falls.

I claim as my invention—

1. The combination of two rear-axle casings arranged in line with each other, side frames which are secured at their rear ends to said casings and hold the same rigidly in position, axles journaled in said casings, a driving mechanism arranged between the inner ends of said axles and connected therewith, and a casing which incloses said driving mechanism and which is journaled on the inner ends of said axle-casings and turns thereon as the front end of the driving-shaft rises and falls, substantially as set forth.

2. The combination of two rear-axle casings arranged in line with each other, side frames which are secured at their rear ends to said casings and hold the same rigidly in position, hollow axles journaled in said casings, an axle-core extending through both hollow axles, a driving mechanism arranged on said core between said axles and connected therewith, and a casing which incloses said driving mechanism and which is journaled on the inner ends of said axle-casings and turns thereon as the front end of the driving-shaft rises and falls, substantially as set forth.

3. The combination of two rear-axle casings arranged in line with each other, side frames which are secured at their rear ends to said casings and hold the same rigidly in position, hollow axles journaled in said casings, an axle-core extending through said axles, a driving-wheel mounted on said core between said axles, compensating gears connecting said wheel with the inner ends of said axles, a casing inclosing said gears and journaled on the inner ends of said axle-casings, a longitudinal driving-shaft journaled in said casing, and a driving-pinion secured to said shaft within said casing and meshing with said driving-wheel, substantially as set forth.

4. The combination of two reaches provided at their rear ends with axle-casings having each at its inner end an inwardly-projecting collar which is provided on its inner side with a ball-cup, axles arranged within said casings and provided each near its inner end with a ball-cone, driving mechanism arranged between the inner ends of said axles and geared therewith, and a casing inclosing said driving mechanism and provided with lateral collars which surround the collars of the axle-casings and are journaled thereon, substantially as set forth.

5. The combination with two independent reaches arranged side by side and having axle-casings at their rear ends, of axles journaled in said casings and carrying the rear wheels at their outer ends, a longitudinal driving-shaft, gearing connecting said driving-shaft with the inner ends of said axles, and a casing inclosing said driving-shaft and gearing and movable concentric with said axles, substantially as set forth.

6. The combination with two independent reach-frames arranged side by side and each consisting of a longitudinal bar, a rear-axle casing and an angle-brace connecting said casing with the front portion of said bar, of axles journaled in said casings and carrying the rear wheels at their outer ends, and a driving mechanism connected with the inner ends of said axles, substantially as set forth.

7. The combination with two independent reaches arranged side by side and each provided with a rear-axle casing, of axles journaled in said casings and carrying the rear wheels at their outer ends, a driving mechanism connected with the inner ends of said axles, a front support, and flexible couplings connecting the front end of each reach with said front support, substantially as set forth.

8. The combination with a fixed front axle and spherical knuckles secured to the same and provided with longitudinal, flaring openings, of two reaches arranged side by side and provided at their front ends with studs which engage in the openings of said knuckles, and spherical washers applied to said studs on the front and rear sides of said knuckles, substantially as set forth.

Witness my hand this 20th day of March, 1900.

WILLIAM VAN WAGONER.

Witnesses:
LEWIS D. MCLOUD,
ALEXANDER D. JENNEY.